(12) United States Patent
Marquette et al.

(10) Patent No.: US 9,322,146 B2
(45) Date of Patent: Apr. 26, 2016

(54) JOYSTICK INPUT ARBITRATION

(71) Applicant: Caterpillar Inc., Peoria, IL (US)

(72) Inventors: Matthew S. Marquette, Peoria, IL (US); Sreeram K. Kristam, Anantapur (IN); Michael J. Firman, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 113 days.

(21) Appl. No.: 13/705,247

(22) Filed: Dec. 5, 2012

(65) Prior Publication Data

US 2014/0156139 A1 Jun. 5, 2014

(51) Int. Cl.
*G06F 3/00* (2006.01)
*E02F 9/22* (2006.01)
*E02F 9/20* (2006.01)
*E02F 9/26* (2006.01)

(52) U.S. Cl.
CPC ............. *E02F 9/2296* (2013.01); *E02F 9/2012* (2013.01); *E02F 9/268* (2013.01); *G05B 2219/35438* (2013.01)

(58) Field of Classification Search
None
See application file for complete search history.

(56) References Cited

U.S. PATENT DOCUMENTS

| 5,714,698 | A | * | 2/1998 | Tokioka et al. | 73/865.4 |
| 5,868,600 | A | * | 2/1999 | Watanabe | A63H 17/36 180/200 |
| 6,129,155 | A | * | 10/2000 | Lombardi | 172/2 |
| 2007/0209356 | A1 | * | 9/2007 | Graeve | B62D 1/22 60/422 |
| 2008/0201994 | A1 | * | 8/2008 | Crago | E01H 5/06 37/197 |
| 2008/0259025 | A1 | * | 10/2008 | Eom | 345/156 |
| 2010/0299031 | A1 | * | 11/2010 | Zhdanov et al. | 701/50 |
| 2012/0316686 | A1 | * | 12/2012 | Dueckman | 700/275 |
| 2013/0023052 | A1 | * | 1/2013 | Tanaka | 435/461 |
| 2013/0080015 | A1 | * | 3/2013 | Strothmann et al. | 701/72 |
| 2013/0096798 | A1 | * | 4/2013 | Jaenke et al. | 701/99 |
| 2013/0107047 | A1 | * | 5/2013 | Sherlock et al. | 348/148 |
| 2013/0204499 | A1 | * | 8/2013 | Buckmier et al. | 701/50 |

* cited by examiner

*Primary Examiner* — Henry Tsai
*Assistant Examiner* — Aurangzeb Hassan
(74) *Attorney, Agent, or Firm* — Glenn Waterfield

(57) ABSTRACT

The present disclosure relates to a system and method for arbitrating between joystick inputs. The system generates a first command based on the first input if the first input has a non-zero value, and generates a second command based on the second input if the first input has a zero value and the second input has a non-zero value. The system thereby allows two different inputs to control a single commanded function.

24 Claims, 7 Drawing Sheets

JOYSTICK INPUT ARBITRATION

TECHNICAL FIELD

The present disclosure relates to processing joystick controls for earthmoving machines.

BACKGROUND

Machines perform a variety of tasks, such as moving material, road maintenance, and excavation. Such machines include wheel loaders, excavators, track-type tractors, haul trucks, and the like. Many such machines have a device for taking an operator input and a hydraulic system for turning the operator input into a machine function. Such functions may include dumping a bucket, raising a boom, lowering a blade, raising a dump body, and the like.

The operator may provide input through the use of a joystick. Functions on the machine may be commanded by tilting the joystick in one direction or another. In addition, there may be additional inputs on the joystick such as buttons, thumbrollers, or rocker switches. The additional inputs usually command different functions. However, it may be desirable for the operator to be able to control a single function on the machine with multiple inputs. Motivation may include regional preference or operator fatigue.

When a single machine function is commanded from two or more different input devices, there is a need to arbitrate between the inputs in a manner that avoids counterintuitive behavior of the machine function. In addition, harsh transitions of the machine function that can shake the machine and operator or spill the load are to be avoided.

SUMMARY OF THE INVENTION

In one aspect of the current disclosure, a method for generating a command by arbitrating between inputs from a first input device and a second input device on a joystick is disclosed. The method comprises receiving a first input from the first input device, receiving a second input from the second input device, generating a first command based on the first input if the first input has a non-zero value, and generating a second command based on the second input if the first input has a zero value and the second input has a non-zero value.

In another aspect of the current disclosure, a system for generating a command by arbitrating between inputs from a first input device and a second input device is disclosed. The system comprises a joystick having a first input device and a second input device. Further, the system comprises a controller for receiving a first input from the first input device and second input from the second input device, generating a first command based on the first input if the first input has a non-zero value, and generating a second command based on the second input if the first input has a zero value and the second input has a non-zero value.

In another aspect of the current disclosure, a method for generating a command by arbitrating between inputs from a first input device and a second input device on a joystick is disclosed. The method comprises receiving a first input from the first input device, receiving a second input from the second input device, generating the command based on the earlier of either of the first input or second input having a non-zero value.

In another aspect of the current disclosure, a system for generating a command by arbitrating between inputs from a first input device and a second input device is disclosed. The system comprises a joystick having a first input device and a second input device. The system further comprises a controller for receiving a first input from the first input device, receiving a second input from the second input device, and generating the command based on the earlier of either of the first input or second input having a non-zero value.

DETAILED DESCRIPTION

Figure 1:
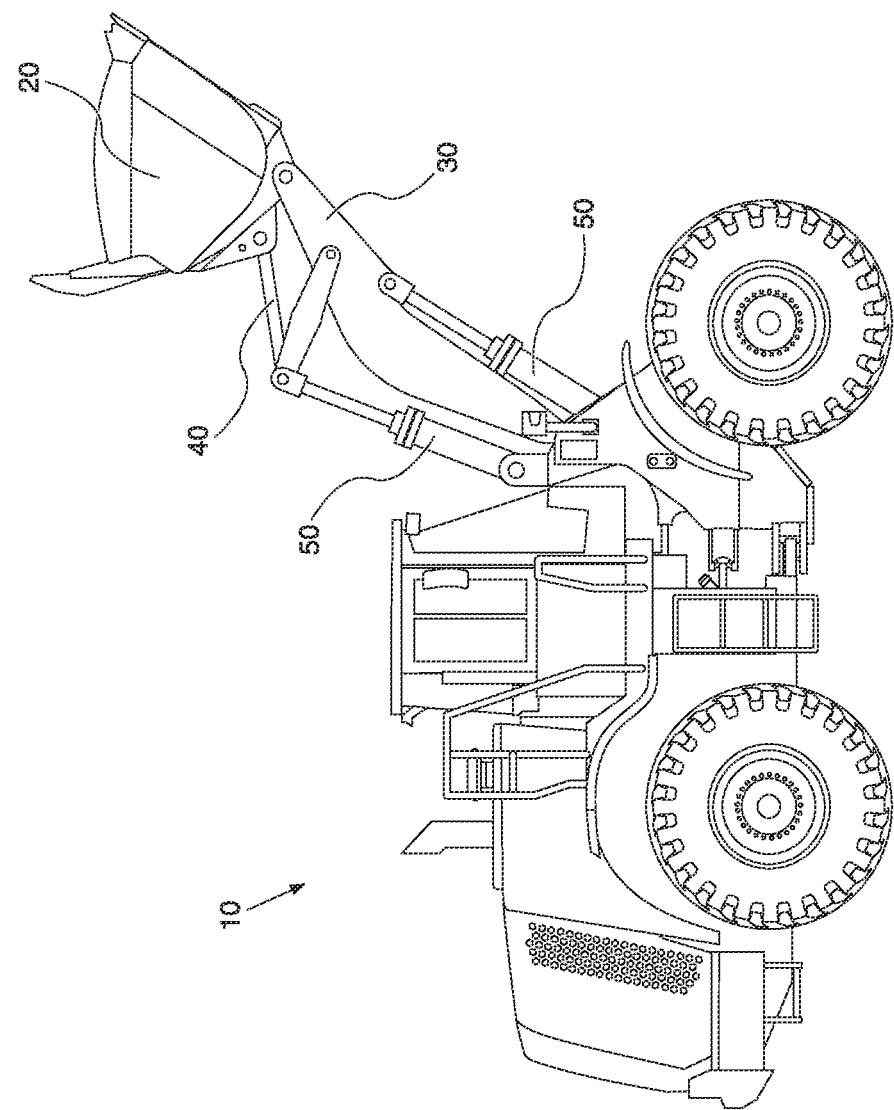
FIG. 1 is a depiction of a machine for use with the system and methods of the current disclosure
Figure 2:
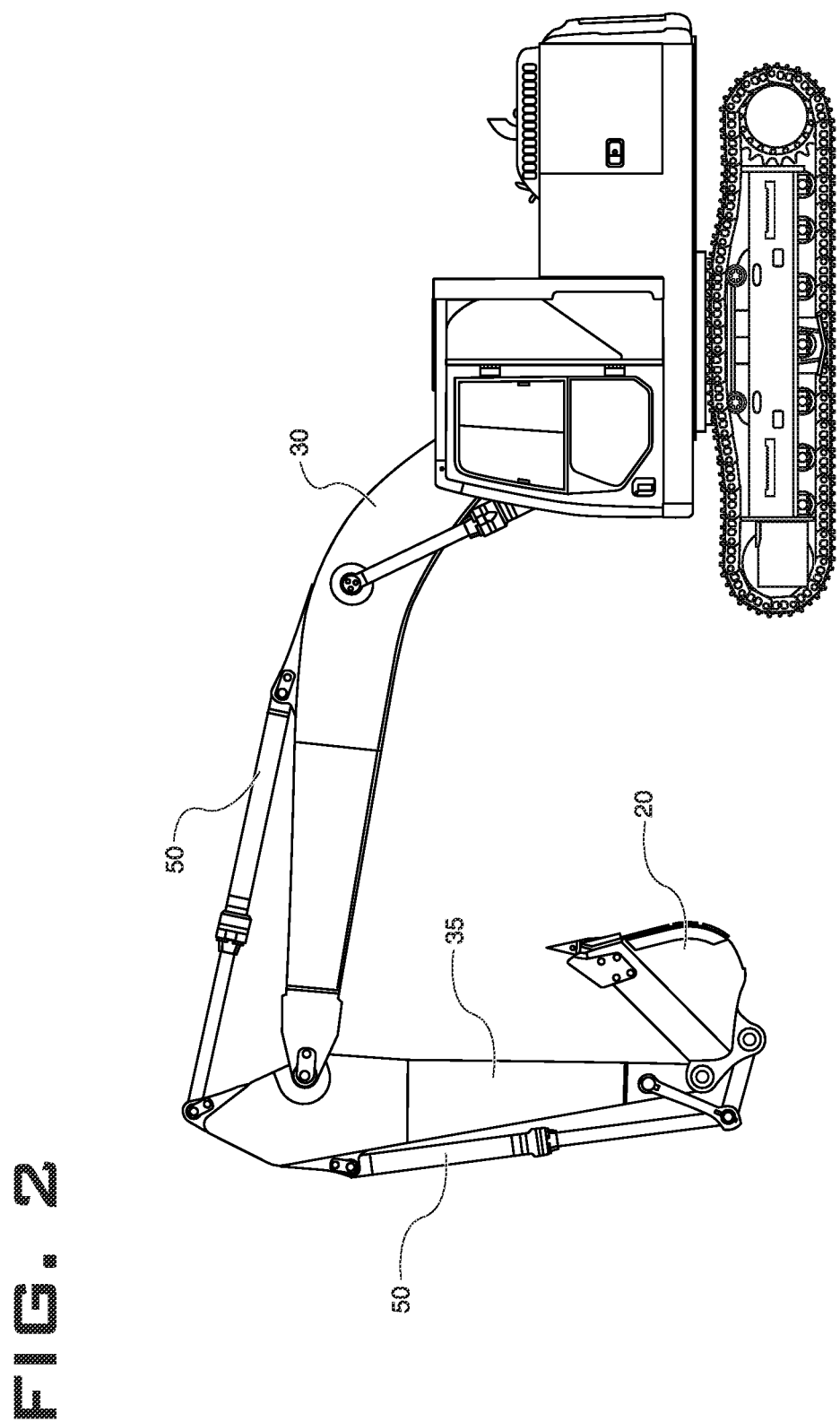
FIG. 2 is a depiction of another machine for use with the system and methods of the current disclosure

The present disclosure relates to joystick controls for a machine 10 such as a wheel loader or an excavator. The machine 10, as shown in FIGS. 1 and 2, has an implement such as a bucket 20 pivotably mounted to a first end of a boom 30. A second end of the boom 30 is pivotably mounted to the frame of the machine 10. Hydraulic excavators may have an additional member, known as a stick 35, between the boom 30 and bucket 20. Force for pivoting the boom 30, stick 35, and bucket 20 is provided by hydraulic cylinders 50 that are connected to them by linkages 40. Hydraulic power for the hydraulic cylinders 50 is typically provided by a hydraulic pump 60 coupled to an engine. Flow from the hydraulic pump 60 to the hydraulic cylinders 50 is controlled by displacing a valve 70. The valve 70 may be displaced manually, by a pilot hydraulic system, or by an electrohydraulic system.

In the case of the electrical solenoid, the valve 70 would be controlled as part of an electrohydraulic system. An electrohydraulic system receives an operator's input from one or more input devices, processes the input in a controller 140, produces a command 130 to the valve 70, and produces a commanded movement to a hydraulic cylinder 50.

Figure 3:
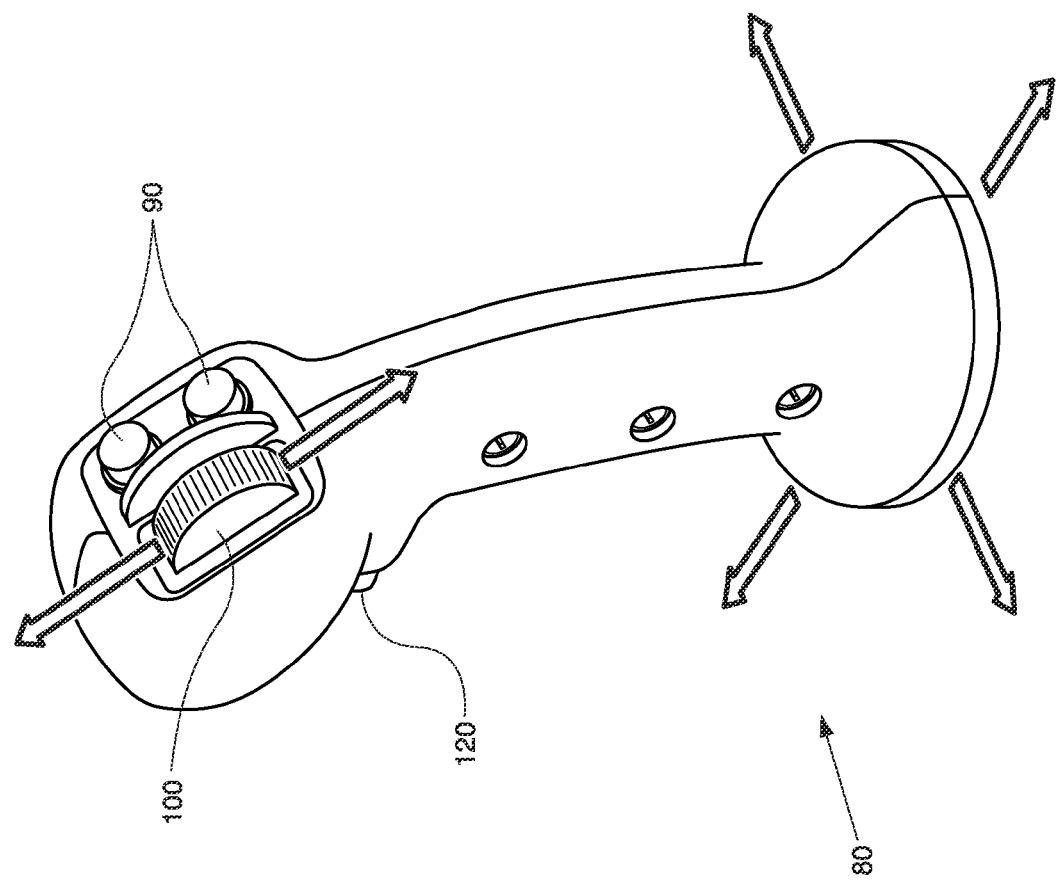
FIG. 3 is a depiction of a joystick for use with the system and methods of the current disclosure

A joystick 80 as shown in FIG. 3 is commonly used as an operator interface in earthmoving machines. Movement of the joystick 80 or activation of input devices on the joystick 80 corresponds to inputs into the controller 140 of the electrohydraulic system. Input devices on the joystick 80 can include buttons 90, thumbrollers 100, rocker switches 110, triggers 120 and the like. Table 1 below illustrates joystick inputs and some commonly used commands.

TABLE 1

| Input | Command |
|---|---|
| Joystick forward | Boom lower |
| Joystick aft | Boom raise |
| Joystick left | Bucket rack |
| Joystick right | Bucket dump |
| Buttons, rollers, rockers, triggers, etc. | Horn, shift, forward/neutral/reverse, kickout, autodig, etc. |

It is recognized in the present disclosure that there are certain earthmoving applications where multiple joystick inputs may correspond to the same command. For instance, bucket rack and bucket dump may be commanded by either joystick left/joystick right or thumbroller up/thumbroller down. In this example, the bucket 20 may be commanded to rack (pivoted toward the rear of the machine 10) by tilting the joystick 80 to the left. The bucket 20 may be commanded to dump (pivoted toward the front of the machine 10) by tilting the joystick 80 to the right. In addition, the bucket 20 may be commanded to rack by moving the rocker switch 110 forward. The bucket 20 may be commanded to dump by moving the rocker switch 110 down. It should be obvious to a person of ordinary skill in the art that the concept is not limited to the example inputs, and could be extended to any other combination of inputs from the joystick 80. For instance, forward/reverse joystick movement and a pair of buttons 90 could also correspond to the same command.

There are several motivations for using multiple joystick inputs to command the same function. First, multiple joystick inputs can accommodate machine operators from different regions of the world. For instance, machine operators in North America may be trained to perform a rack/dump function using a joystick tilt input, while operators in Australia may be trained to perform a rack/dump operation using a thumbroller input. A machine designer may need to accommodate both preferences in order to sell a global product. Second, multiple ways of performing a repetitive action may help prevent operator fatigue. Operators of earthmoving machines may spend an entire work shift operating the same machine 10. An electrohydraulic system that can receive multiple inputs to perform the same command may give the operator some relief. During the course of a shift, the operator may perform a repetitive operation via one input for a period of time and a second input for another period of time. Third, the machine 10 may pitch and roll as the boom 30 raises and lowers, and as the bucket 20 engages the ground or dumps material. Using inputs that require a relatively delicate touch, such as operation of the thumbroller 100, may not be convenient as a wheel loader decelerates into a pile of material or as a hydraulic excavator breaks into the ground. An electrohydraulic system that can receive multiple inputs to perform the same command may give the operator the option of choosing a convenient input method to match the motion of the machine 10.

Figure 4:
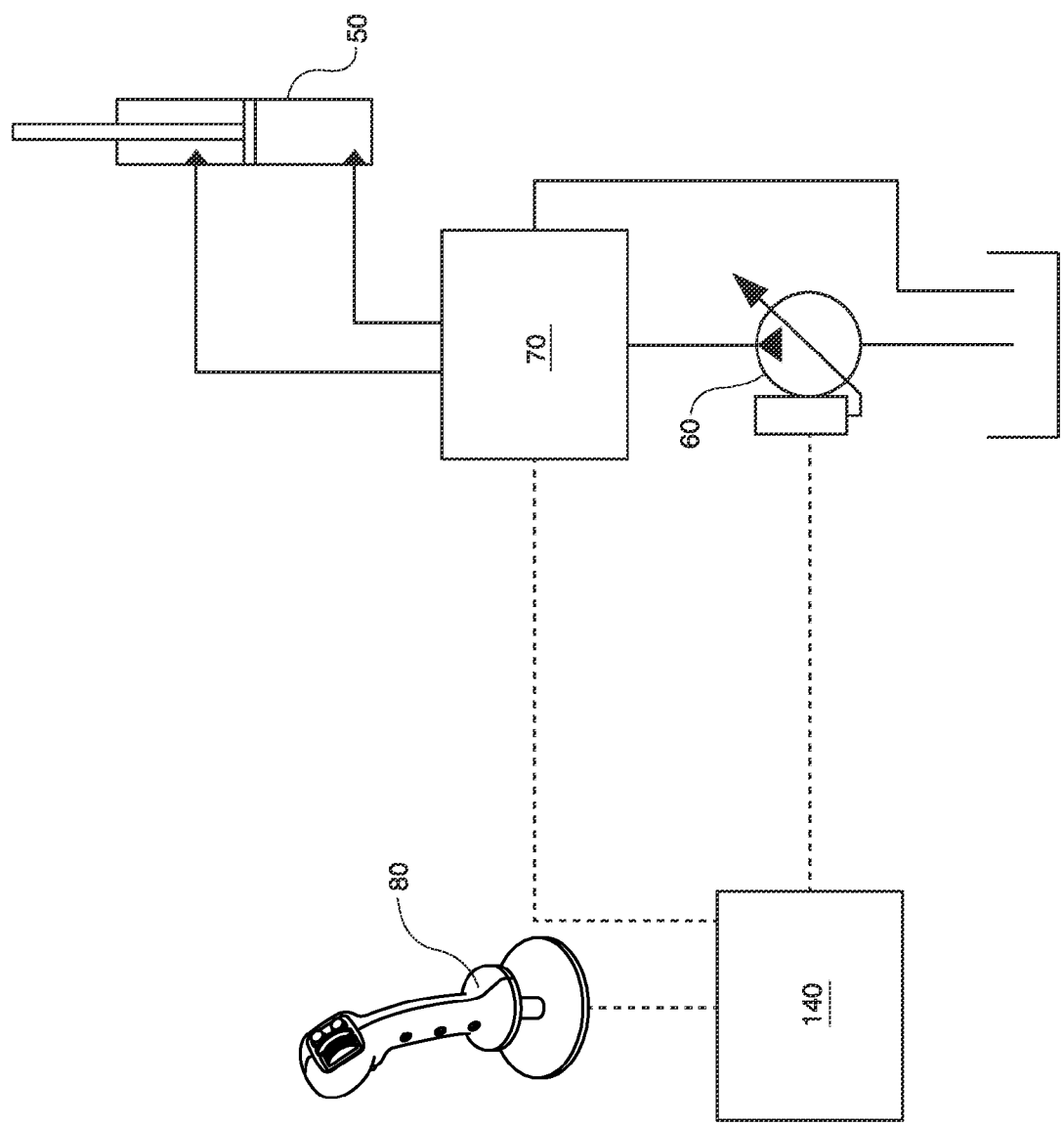
FIG. 4 is a diagram of a hydraulic system for use with the system and methods of the current disclosure

FIG. 4 shows a functional block diagram of a controller 140. The controller 140 includes features well-known in the art such as a microprocessor, memory, and input/output circuitry. The controller 140 is configured to execute control software. The controller 140 as shown FIG. 4 is configured to receive at least two inputs, but it is understood that the current disclosure could incorporate additional inputs. A first input 134 is received from an input device into an input processing block 160. The first input 134 could consist of an analog signal, pulse-width modulated (PWM) signal, or any other type of signal that can be used for an input. This raw input command may then proceed from the input processing block 160 to an open-loop processing block 170. The open-loop processing block 170 may include the function of making a correlation from the raw input to an associated command percentage. For instance, an input of 10% of maximum range may correspond to 20% of command percentage, 50% may correspond to 50% of command percentage, 100% may correspond to 100% of command percentage, and so on. The open-loop processing block 170 may also include a deadband range. The open-loop processing block 170 may include an input rate limit function. The input rate limit function imposes a rate limit in order to keep the commanded signal from exceeding the capabilities of the electrohydraulic system and preventing jerky movements of the implements. The output of the input rate limit function may be limited to a certain percentage of the maximum output each time its software loop executes. For example, the rate limit could be defined as 5% of the maximum allowed output per 20 ms iteration of the software loop. The open-loop processing block 170 may include an input filter function. Note that the open-loop processing block 170 may differ from application to application.

Figure 5:
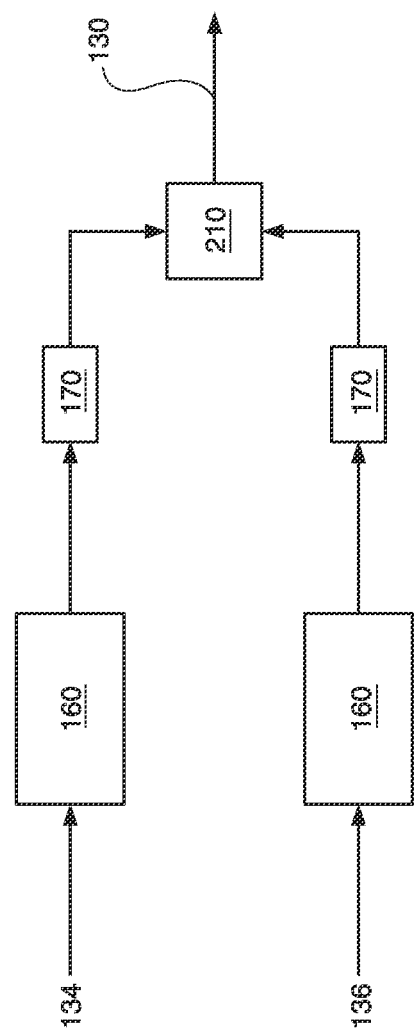
FIG. 5 is a logic diagram for use with the system and methods of the current disclosure

As shown in FIG. 5, the second input 136 may go through similar steps as described above for the first input 134. The number and type of steps required to process the inputs can vary depending on the nature of the input and the application.

At this point, the first input 134 and second input 136 have finished input processing and proceed to the command arbitration block 210. The purpose of the arbitration block 210 is to receive first input 134 and second input 136 and generate an output command based on certain criteria.

Figure 6:
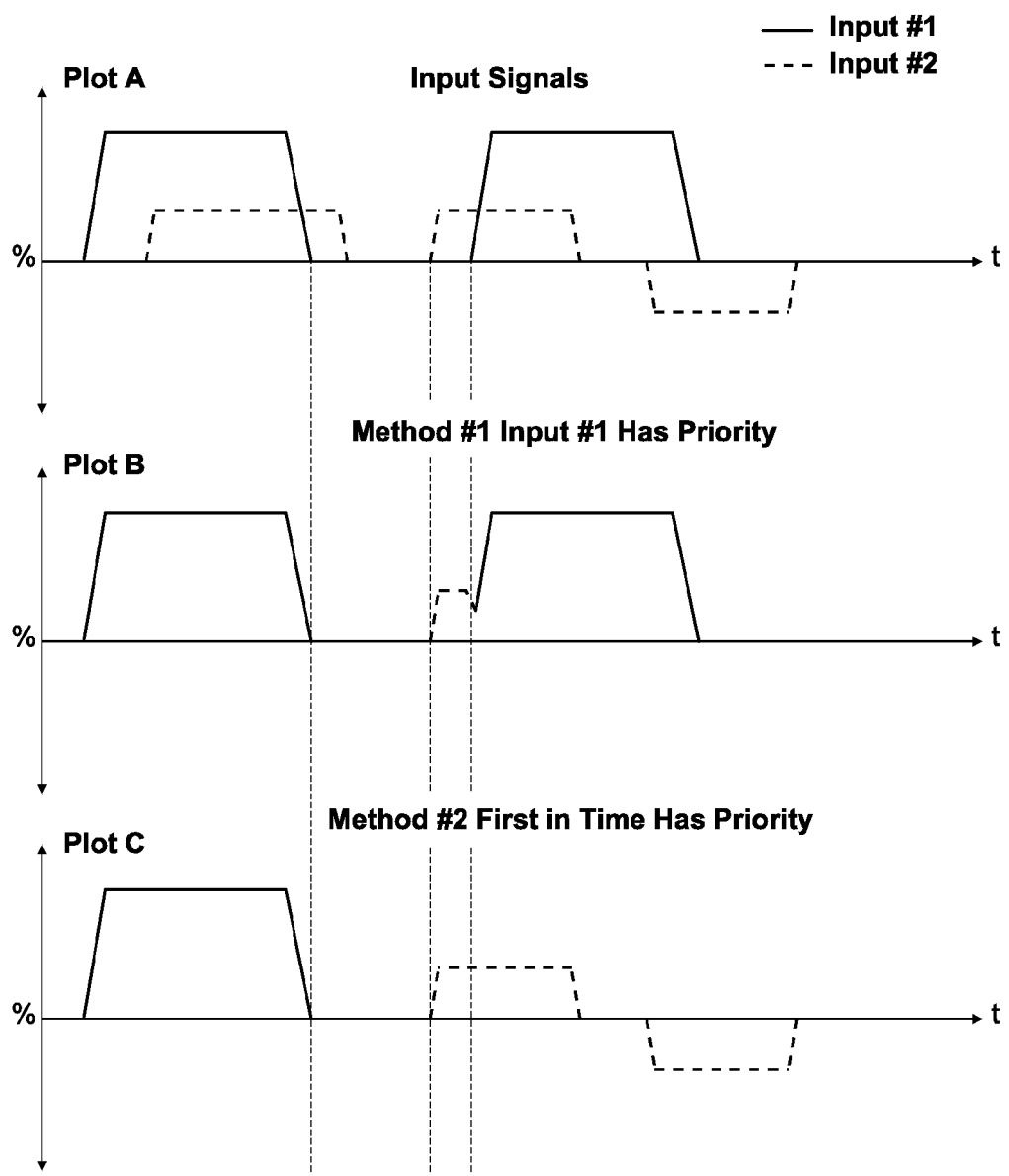
FIG. 6 is a plot showing inputs and outputs consistent with the system and methods of the current disclosure

One method for arbitrating between inputs begins by assuming that one input has priority over the second input. For example, the command arbitration block 210 may assume that the first input 134 has priority over the second input 136. According to this method, a command 130 will be generated based on the first input 134 while the first input 134 has a non-zero value. The second input 136 will be ignored while the first input 134 has a non-zero value. A command 130 will only be generated from the second input 136 if the first input 134 has a value of zero. The command arbitration block 210 may only generate a command based on the second value 136 if the first input 134 has a non-zero value for a predetermined period of time. Plot A of FIG. 6 shows the inputs 134 and 136, while Plot B shows the generated command 130 for this method.

Switching from the first input 134 and the second input 136 and vice versa can result in harsh transitions in the generated command 130. Therefore, the command arbitration block 210 may include a rate-shaping function 220. The rate-shaping function 220 may be used when the command arbitration block 210 is transitioning from generating the command 130 from the first input 134 to the second input 136 and vice versa. The rate-shaping function 220 is accomplished by subtracting the lesser of the command 130 that was to be generated from the greater of the command 130 that was to be generated and dividing by two. The rate-shaping function 220 may also employ a rate-limiting technique as disclosed earlier.

As an example of practicing the first method, consider that the first input 134 comes from an operator tilting the joystick 80 while the second input 136 comes from the operator moving the thumbroller 100. The first input 134 representing the joystick tilt is assumed for this example to have priority. The command 130 is generated from the movement of the joystick 80. If the operator moves the thumbroller 100, the second input 136 is ignored. If the operator releases the joystick 80, the first input 134 will settle to a zero value. Movement of the thumbroller 100 will then generate a command 130 based on the second input 136. The command arbitration block 210 may require the first input 134 to have a zero value for a predetermined period of time, such as 0.5 seconds, before generating the command 130 based on the second input 136. Any movement of the joystick 80 which generates a first input 134 with a non-zero value will cause the command arbitration block 210 to generate a command 130 based on the first input 134 instead of the second input 136. If there is a large difference between the command 130 generated from the first input 134 and what the command 130 was generated from the second input 136, the rate-shaping function 220 may be employed. The rate-shaping function 220 can prevent harsh movement of the boom 30 or bucket 20 than can cause the machine 10 to pitch or spill material from the bucket 20.

A second method for arbitrating between inputs begins by assuming that neither input has priority at the start of the method. According to this method, priority will be given to the first input received by the command arbitration block 210 after the start of the method. A command 130 will be generated based on the first input received. The second input received will be ignored while the first input received has a non-zero value. A command 130 will not be generated from the second input value received until both inputs have a zero value for a predetermined period of time. Plot A of FIG. 6 shows the inputs 134 and 136, while Plot C shows the generated command 130 for this method.

Switching between the two inputs can result in harsh transitions in the generated command 130. As in the previous method, the command arbitration block 210 may include a rate-shaping function 220 to prevent harsh transitions.

As an example of practicing the second method, consider that the first input 134 comes from an operator tiling the joystick 80 while the second input 136 comes from the operator moving the thumbroller 100. The first input 134 representing the joystick tilt is the first input received by the command arbitration block 210 and is therefore given priority. The command 130 is generated from the movement of the joystick 80. If the operator moves the thumbroller 100, the second input 136 is ignored. If the operator releases the joystick 80, the first input 134 will settle to a zero value. If both first input 134 and second input 136 have a zero value, then subsequent movement of the thumbroller 100 will generate a command 130 based on the second input 136. The command arbitration block 210 may require the first input 134 and the second input 136 to have a zero value for a predetermined period of time, such as 0.5 seconds, before generating the command 130 based on the second input 136. If there is a large difference between the command 130 generated from the first input 134 and what the command 130 was generated from the second input 136, the rate-shaping function 220 may be employed.

Figure 7:
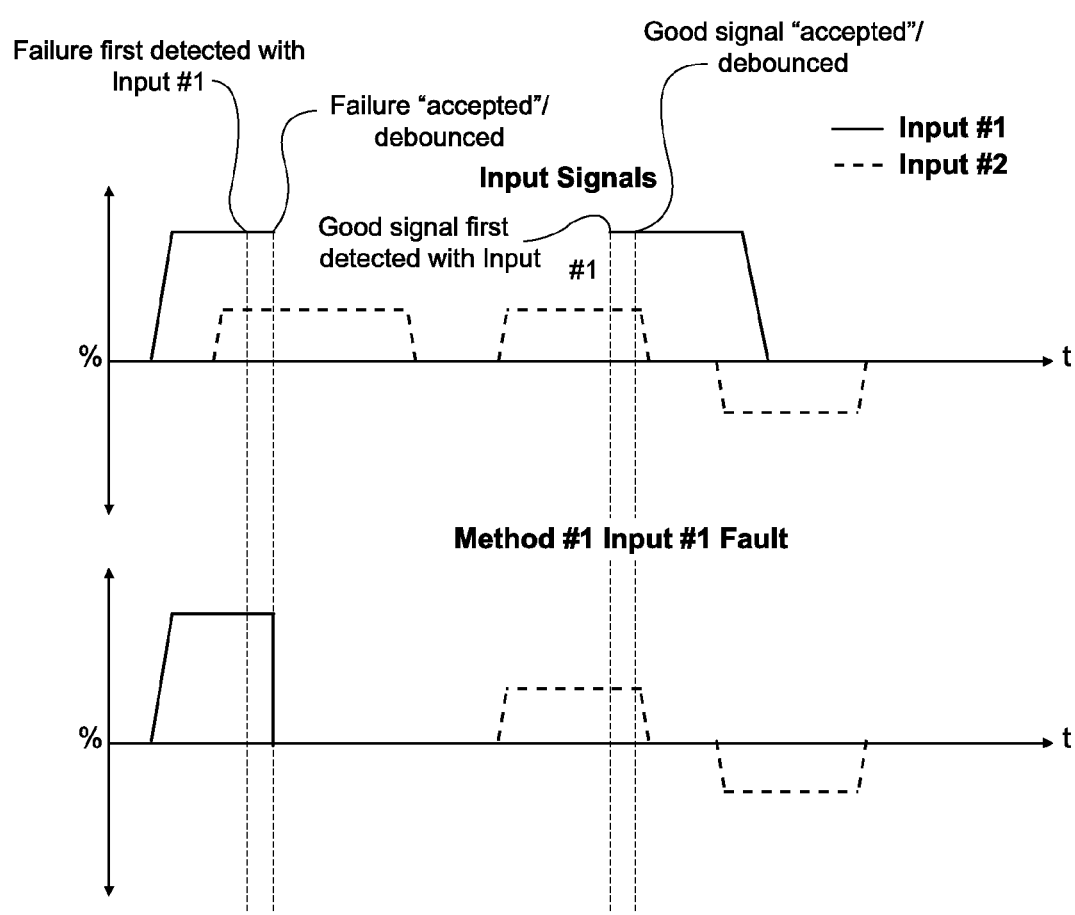
FIG. 7 is a plot showing inputs and outputs consistent with the system and methods of the current disclosure

There may be situations when there is a fault with either first input 134 or second input 136. Refer to FIG. 7. The controller 140 will detect a fault when one of the inputs 134, 136 provides a value that is out of an acceptable range. The value provided may be a duty cycle, a voltage, a current, or a CAN message.

When either first input 134 or second input 136 is determined by controller 140 to be out of range, that input is flagged as faulty and its input may be ignored by the controller 140. This may be known as "debouncing" the faulty signal. The controller then changes the generated command 130 to a value of zero. There may be some delay between when the fault is first detected and when the controller 140 takes action to flag it as faulty. If a signal is flagged as faulty, a non-zero value detected in the other input may be ignored. In the case of a faulted signal, the controller 140 may retain the "last known good value" while a signal is outside of the valid range. Once the debounce time has expired, the controller 140 considers the signal as faulty and sets a status flag to indicate the signal is faulty. Functions downstream in controller 140 may look at the status flag first before doing any operations based on the signal. If the signal is flagged as faulty, the controller 140 may execute some failure mode functions. The functions may assume that the input signal is zero, or it may perform other actions depending on the requirements. Inputs 134 and 136 may be ignored until both first input 134 and second input 136 have a zero value. The controller 140 may require both first input 134 and second input 136 have a zero value for a predetermined period of time before accepting either input and generating a new non-zero command 130.

There may be a situation when a signal that has been flagged as faulty will come back into an acceptable range while a command 130 is being generated based on the other input. In this case, the signal that has been flagged as faulty will not be accepted by the controller 140 until that signal has a zero value. The controller 140 may require both the first input 134 and second input 136 to have a zero value for a predetermined period of time before the fault flag is removed from the signal and accepted by the controller 140.

INDUSTRIAL APPLICABILITY

An example of a machine 10 may be a wheel loader. A wheel loader typically operates in a cycle that includes loading and dumping. Loading is typically from a pile of material, while dumping is typically into the bed of a truck or into a hopper. At the beginning of the loading portion of the cycle, the operator provides an input commanding the boom 30 to be in a lowered position and the bucket 20 to be positioned to accept material. The operator then drives the machine 10 into the pile of material where the power from the engine and the inertia of the machine 10 pushes the bucket 20 into the pile and loads the bucket 20 with material. The loading portion of the cycle is fairly violent, causing rapid deceleration and pitching of the machine 10. The operator then provides an input that racks the bucket 20 back into a position to hold material and provides another input to raise the boom 30 in order to lift the material from the pile. The operator then reverses the machine 10 away from the pile and drives to the side of the truck while raising the boom 30 such that the bucket will clear the truck. Next, the operator provides another input that tilts the bucket 20 toward the front of the machine 10, dumping the material. The dumping portion of the cycle requires careful operation of the inputs of the machine 10 in order to avoid contact with the truck and to prevent spillage of material.

Example inputs for the wheel loader loading cycle may include tilting the joystick 80 left and right to rack and dump the bucket 20 respectively. Alternatively, the thumbroller 100 may be used to rack and dump the bucket 20. During the loading portion of the cycle, it may be preferable for the operator to use the joystick tilt for commanding bucket 20 movement, as it is easy for the operator to keep his hand gripped to the joystick 80. Alternatively, it may be preferable for the operator to use the thumbroller 100 for the dumping portion of the cycle as it allows more precise operation. Therefore, the present disclosure allows the operator to use whichever input is more convenient in order to perform the same function. A person of ordinary skill in the art will recognize that any two joystick functions can be used to perform any machine function using what is taught in the current disclosure. For example, boom operation could be performed by forward/reverse tilting of the joystick 80 and a rocker switch.

Another example of a machine 10 may be an excavator. An excavator typically operates in a cycle that includes loading and dumping. Loading is typically from unbroken ground, while dumping is typically into the bed of a truck. At the beginning of the loading portion of the cycle, the operator provides an input commanding the boom 30 and stick 35 to be in an extended position and the bucket 20 to be extended with the bucket teeth positioned to break into the ground. The operator then provides an input that racks the bucket 20 back to break into the ground and provides other inputs to curl the stick 35 the boom 30 in order to break the ground and lift the material from the ground. The loading portion of the cycle is fairly violent, causing and pitching of the machine 10. The operator then swings the machine 10 toward the side of the truck while raising the boom 30 such that the bucket will clear the truck. Next, the operator provides another input that tilts the bucket 20, dumping the material. The dumping portion of the cycle requires careful operation of the inputs of the machine 10 in order to avoid contact with the truck and to prevent spillage of material.

Example inputs for the excavator loading cycle may include tilting the joystick 80 left and right to rack and dump the bucket 20, respectively. Alternatively, the rocker switch 110 may be used to rack and dump the bucket 20. During the loading portion of the cycle, it may be preferable for the operator to use the joystick tilt for commanding bucket 20 movement, as it is easy for the operator to keep his hand gripped to the joystick 80. Alternatively, it may be preferable for the operator to use the rocker switch 110 for the dumping portion of the cycle as it allows more precise operation.

What is claimed is:

1. A method for generating a command for a work machine by arbitrating between inputs from a first input device and a second input device, each located on a joystick of a work machine, comprising:
   receiving a first input from the first input device on the joystick of a work machine;
   receiving a second input from the second input device on the joystick of the work machine;
   wherein said first input and said second input are capable of being received concurrently,
   generating a first command for a first operation carried out by the work machine based on the first input from the first input device if the first input has a non-zero value;
   generating a second command for the first operation based on the second input from the second input device if the first input has a zero value and the second input has a non-zero value;
   arbitrating between the first command and the second command; and
   executing the first operation based upon either one of the first command or the second command depending upon said arbitrating.

2. The method of claim 1 wherein during a transition between generation of the first and second command, a third command is generated using a rate limit based on the difference between the first command and the second command.

3. The method of claim 1 wherein the second command is generated based on the second input if the first input has a zero value for a predetermined period of time and the second input has a non-zero value.

4. The method of claim 1 wherein if either of the first input or second input is out of acceptable range, a fourth command having a zero value is generated.

5. The method of claim 4 wherein a second command is generated based on the second input after the second input has a zero value if the first value is out of the acceptable range.

6. The method of claim 5 wherein a second command is generated based on the second input after the second input has a zero value for a predetermined period of time if after the first value is out of the acceptable range.

7. A system for generating a command for a work machine by arbitrating between inputs from a first input device and a second input device comprising:
   a joystick of a work machine, the joystick having a first input device and a second input device; and
   a controller of the work machine, the controller configured to perform:
   receiving a first input from the first input device on the joystick of the work machine and a second input from the second input device on the joystick of the work machine;
   wherein said first input and said second input are capable of being received concurrently,
   generating a first command for a first operation carried out by the work machine based on the first input from the first input device if the first input has a non-zero value;
   generating a second command for the first operation based on the second input from the second input device if the first input has a zero value and the second input has a non-zero value;
   arbitrating between the first command and the second command; and
   executing the first operation based upon either one of the first command or the second command depending upon said arbitrating.

8. The system of claim 7 wherein during a transition between generation of the first and second command, the controller generates a third command using a rate limit based on the difference between the first command and the second command.

9. The system of claim 7 wherein the controller generates a second command based on the second input if the first input has a zero value for a predetermined period of time and the second input has a non-zero value.

10. The system of claim 7 wherein the controller generates a fourth command having a zero value if either of the first input or second input is out of acceptable range.

11. The method of claim 10 wherein the controller generates a second command based on the second input after the second input has a zero value if the first value is out of acceptable range.

12. The method of claim 11 wherein a second command is generated based on the second input after the second input has a zero value for a predetermined period of time if the first value is out of acceptable range.

13. A method for generating a command for a work machine by arbitrating between inputs from a first input device and a second input device, each located on a joystick of a work machine, comprising:
   receiving a first input from the first input device on a joystick of a work machine;
   receiving a second input from the second input device on the joystick of the work machine,
   wherein said first input and said second input are capable of being received concurrently;
   generating the command carried out by the work machine based on arbitrating between the earlier of the first input from the first input device for a first operation or the second input from the second input device for the first operation having a non-zero value; and,
   executing the first operation based upon said generating.

14. The method of claim 13 wherein the generated command is based on a later input if the later input has a non-zero value after the first and second input have a zero value.

15. The method of claim 14 wherein the generated command is based on another input if the other input has a non-zero value after the first and second input values are zero for a predetermined period of time.

16. The method of claim 13 wherein if either of the first input or second input is out of acceptable range, a fourth command having a zero value is generated.

17. The method of claim 16 wherein a second command is generated based on the second input after the second input has a zero value if the first value is out of the acceptable range.

18. The method of claim 17 wherein a second command is generated based on the second input after the second input has a zero value for a predetermined period of time if the first value is out of acceptable range.

19. A system for generating a command for a work machine by arbitrating between inputs from a first input device and a second input device comprising:
  a joystick of a work machine, the joystick having a first input device and a second input device; and
  a controller of the work machine, the controller configured to perform:
    receiving a first input from the first input device on the joystick of the work machine;
    receiving a second input from the second input device on the joystick of the work machine,
    wherein said first input and said second input are capable of being received concurrently;
    generating the command carried out by the work machine based on arbitrating between the earlier of the first input from the first input device for a first operation or the second input from the second input device for the first operation having a non-zero value; and
    executing the first operation based upon said generating.

20. The system of claim 19 wherein the controller generates the command based on a later input if the later input has a non-zero value after the first and second input have a zero value.

21. The method of claim 20 wherein the controller generates the command based on another input if the other input has a non-zero value after the first and second input values are zero for a predetermined period of time.

22. The system of claim 19 wherein the controller generates a fourth command having a zero value if either of the first input or second input is out of acceptable range.

23. The method of claim 22 wherein the controller generates a second command based on the second input after the second input has a zero value if the first value is out of acceptable range.

24. The method of claim 23 wherein a second command is generated based on the second input after the second input has a zero value for a predetermined period of time if the first value is out of acceptable range.

* * * * *